Figure 1:
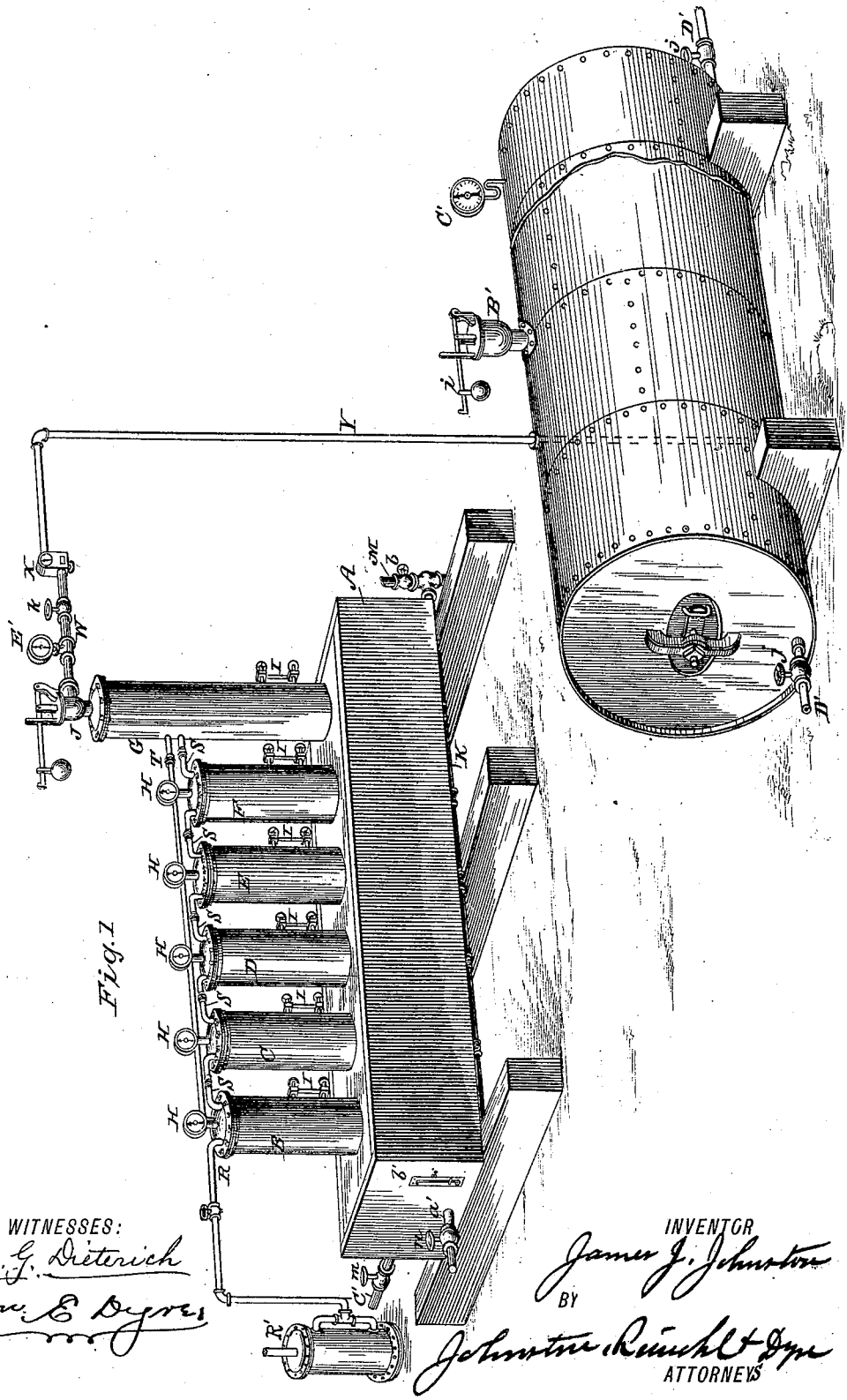

(No Model.) 3 Sheets—Sheet 1.

J. J. JOHNSTON.
PROCESS OF AND APPARATUS FOR MANUFACTURING HEATING GAS.

No. 356,477. Patented Jan. 25, 1887.

WITNESSES:
Fred. G. Dieterich
Wm. E. Dyres

INVENTOR
James J. Johnston
BY
Johnston Reichl & Dye
ATTORNEYS

N. PETERS, Photo-Lithographer, Washington, D. C.

(No Model.) 3 Sheets—Sheet 3.

J. J. JOHNSTON.
PROCESS OF AND APPARATUS FOR MANUFACTURING HEATING GAS.

No. 356,477. Patented Jan. 25, 1887.

WITNESSES:
Fred G. Dieterich
Wm. E. Dyn

INVENTOR
James J. Johnston
BY
Johnston Reinohl & Dyn
ATTORNEYS

UNITED STATES PATENT OFFICE.

JAMES J. JOHNSTON, OF COLUMBIANA, OHIO, ASSIGNOR OF ONE-HALF TO ALBERT C. ELLIS, OF PITTSBURG, PENNSYLVANIA.

PROCESS OF AND APPARATUS FOR MANUFACTURING HEATING-GAS.

SPECIFICATION forming part of Letters Patent No. 356,477, dated January 25, 1887.

Application filed February 23, 1886. Serial No. 192,893. (No model.)

*To all whom it may concern:*

Be it known that I, JAMES J. JOHNSTON, a citizen of the United States, residing at Columbiana, in the county of Columbiana and State of Ohio, have invented certain new and useful Improvements in Process of and Apparatus for Manufacturing Heating-Gas; and I do hereby declare the following to be a full, clear, and exact description of the invention, such as will enable others skilled in the art to which it appertains to make and use the same.

The invention relates to the production of a cheap heating-gas as a substitute for the gases and the various kinds of fuel used in the arts, and also a fuel for fire-places in dwelling-houses, offices, and buildings generally where it is desirable to use what is known as the "open fire-place," or for furnaces for heating buildings.

The state of the art reveals the fact that for the purpose above stated the production of gas has been attended with great trouble and always with considerable expense, and for the purpose of making such gas various materials have been employed, such as coal, the slacks of coal, petroleum-oil, and the volatile products obtained therefrom, such as benzole and gasoline. Apparatus of various constructions have been employed in connection with the manufacture of such gas, all of which are more or less costly, and, as a rule, complicated in their structure, often requiring a high degree of skill and long experience to operate them.

In the use of petroleum-oil and its volatile products air, solid carbon, heat, and steam have been employed in various ways, and by a variety of means, for the purpose of producing a cheap gas. Atmospheric air has been passed through a body of petroleum-oil and its volatile products, and has been caused to pass over the surface of said oil and its products and traverse a series of surfaces arranged in different horizontal and vertical planes. Air has been heated and applied to petroleum-oil and its volatile products in the same manner. Air has also been heated and superheated and applied to said oil and its products. Steam has been applied to petroleum-oil and its products in the same manner as air above described, and air and steam combined have been applied in like manner. Petroleum-oil has also been heated and atmospheric air forced through it. The various gases resulting from such applications of air and steam to petroleum oil and its products have been employed in the arts for heating and illuminating purposes; and air and steam treated as above described have been combined with solid carbons and subjected to high degrees of heat, and employed for the purposes stated.

Superheated steam and air have been applied to the surface of petroleum-oil contained in a vessel and mingled with the vapors of said oil evolved by said heat, and subsequently subjected to a high degree of heat for the purpose of making a fixed gas therefrom, as described by me in my Patent No. 50,935, granted November 14, 1865, and reissued September 9, 1873, No. 5,570, and August 13, 1878, No. 8,373.

In all of the various processes referred to the gases arising from the air, heated air, or steam, and petroleum-oil, or its volatile products have been condensable, unless fixed by subjecting them to a high degree of heat subsequent to the mixing of the gases.

Air and petroleum-oil each have their peculiar properties, and we cannot impart to them other properties than those which they possess; but my object is to so apply the laws that control them as to produce practically a fixed gas for heating purposes. What I mean by a "fixed gas" is gas which will not condense in a holder or distributing-pipes, and is made under pressure without the application of a high degree of heat as in the manufacture of ordinary coal-gas. It is a fact well known that atmospheric air consists of oxygen and nitrogen, and petroleum-oil consists of carbon and hydrogen, and that the particles of these elements have each their own atomic weight and combining quantity. It is also well known that these elements and their particles are unlike, and that chemical affinity acts only upon unlike particles. Therefore these elements will unite and form a gas.

The purpose of my invention, therefore, is to unite the elements contained in atmospheric air and petroleum-oil by causing atmospheric air and petroleum-oil to act the one upon the other, in the manner hereinafter described, for the purpose of producing a fixed, cheap, and efficient heating-gas.

Figure 2:
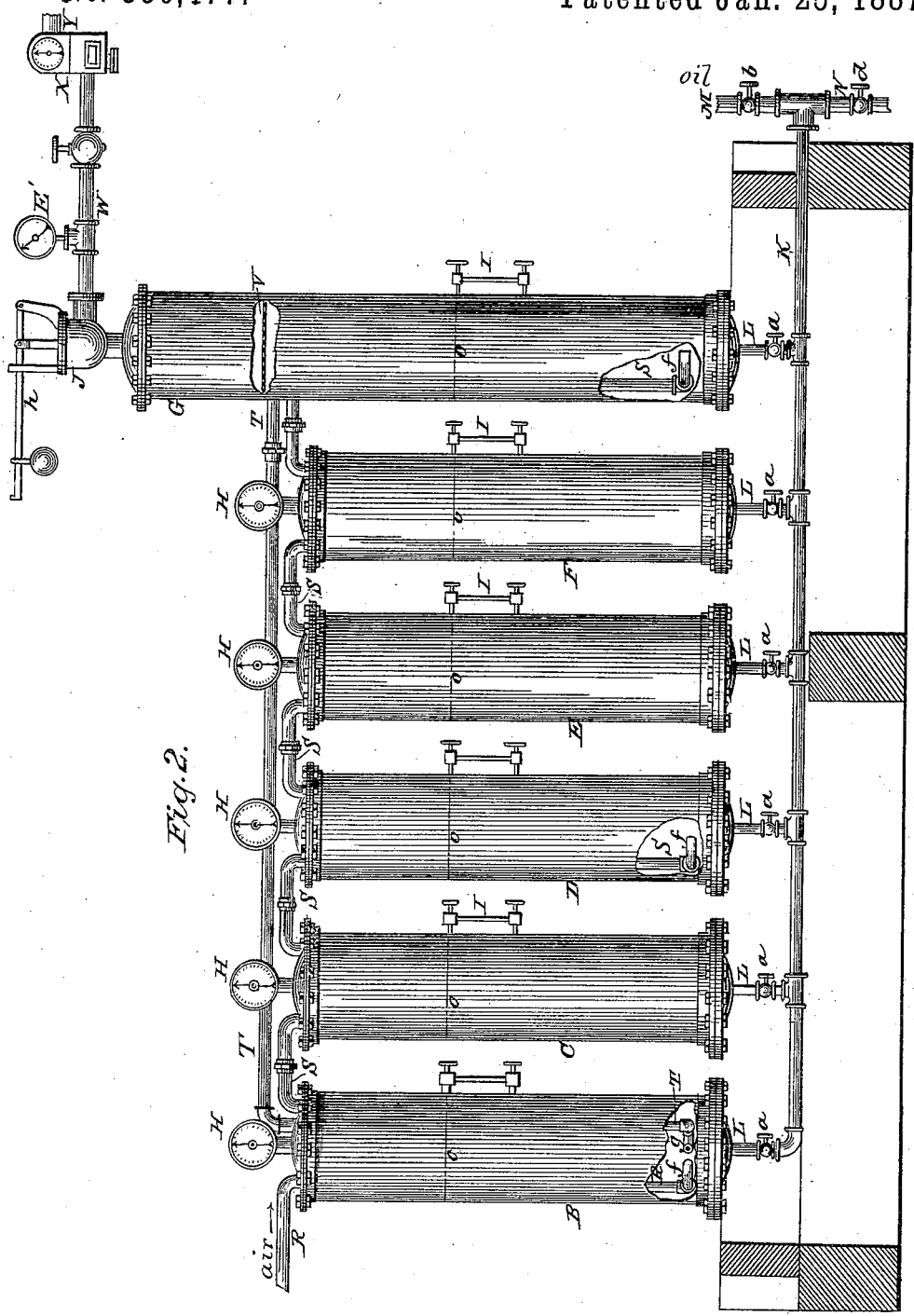
Figure 3:
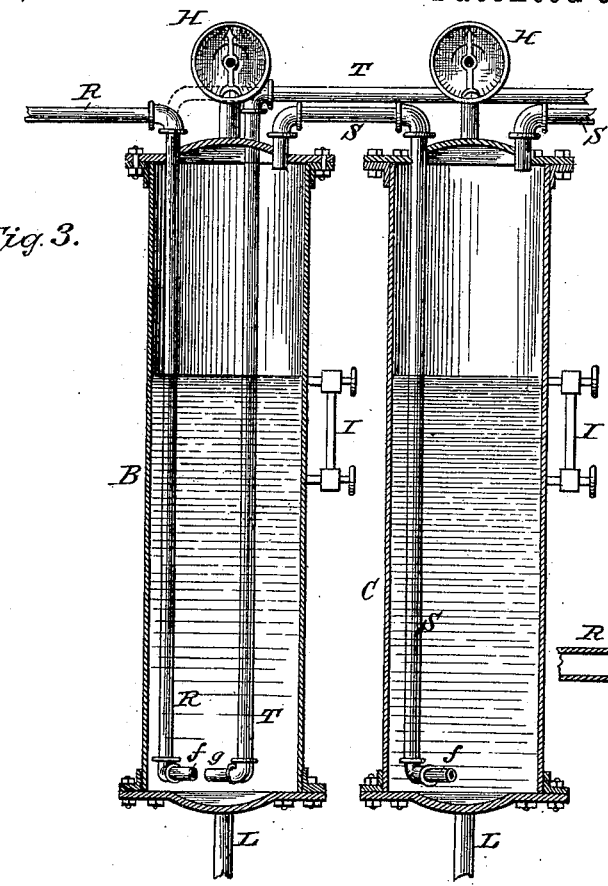
Figure 4:
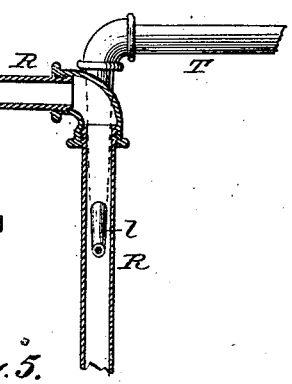
Figure 6:
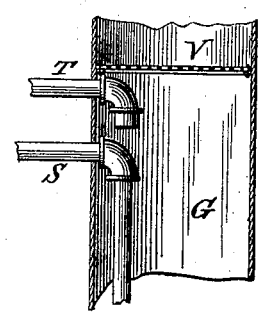
Figure 5:
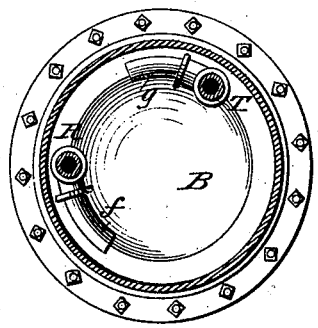

In the accompanying drawings, which form a part of my specification, Figure 1 is a perspective view of the apparatus employed for carrying out my invention. Fig. 2 is a side elevation of a series of vessels and their communications for generating gas, partly in section. Fig. 3 is a vertical section of two of the vessels. Figs. 4, 5, and 6 are sectional details.

In order that others skilled in the art to which my invention appertains may understand its construction and operation, I will now proceed to describe the same.

Before describing the apparatus I would state that by heating petroleum-oil to 186° Fahrenheit it evolves benzole, and that the other products of it are evolved by increasing the heat in proportion as its lighter products are carried off and its specific gravity increased. Therefore the operator will be required to be careful not to heat the oil at the beginning of the operation to a temperature exceeding 100° Fahrenheit, and always bear in mind that the temperature of the oil in all cases must be kept much below the evolving-point of benzole until all of its light and volatile products have been carried off and its specific gravity increased to about 40°, at which point the temperature may be gradually increased in proportion as the specific gravity of the oil increases; but in no case should its temperature (after the lighter products have been carried off) exceed 210° Fahrenheit.

In all cases the oil in the vessels should be subjected to pressure, and I have found by practicing my invention that an average pressure of eight (8) pounds to the square inch produces a very desirable result, the quality of the gas increasing with the increase of the pressure upon the surface of the oil in the generators.

I wish it distinctly understood that every precaution should be taken to avoid evolving vapor from the oil or charging the atmospheric air with vapor, as ordinarily practiced in carbureting air for making illuminants.

The application of the pressure described and avoiding the evolving of vapor from the oil are two essential features of my invention.

I will now proceed to describe the apparatus, reference being had to the drawings and the letters of reference marked thereon.

A represents a tank containing water, in which is placed the vessels B, C, D, E, F, and G. Said vessels are provided with pressure-gages H, the vessel G having an adjustable gage or pressure-valve, J. The vessels are also provided with ordinary sight-gages, for indicating the height of the oil in said vessels. The lower ends of the vessels communicate with a pipe, K, by means of branches L, provided with valves $a$, which branches extend through the bottom of the water-tank A. The water-tank is provided with a steam-pipe, $a'$, having a valve, $n$, and may traverse the interior of the tank for the purpose of heating the water contained therein, and thereby heating the oil in the vessels to the desired temperature, (which heat is indicated by a thermometer, $b'$, in one end of the tank A,) and with a water-supply pipe, C', having a valve, $m$. The pipe K communicates with a pipe, M, which communicates with an oil-supply, said pipe being provided with a valve, $b$. To pipe K is connected branch pipe N, having valve $d$.

The pipe R communicates with an air-pump, R', which, by preference, is of the class provided with a by-pass valve to circulate the air from one side of the piston to the other when the maximum pressure has been attained in the vessel G. When the pressure in the vessels has been reduced by the opening of the valve J, the pump will again deliver air into the vessel B and continue the circulation thereof through the vessels. The pipe R enters through the top of the vessel B, extends to the bottom of said vessel, and terminates in a curved lateral discharge-branch, $f$, as shown in Figs. 3 and 5. To the upper end of the vessel B is attached a pipe, S, which passes through the upper end of the vessel C, extends to the bottom thereof, and also terminates in a curved branch of the same construction as $f$ in vessel B. Each of the successive vessels is provided with a similar construction, and need not therefore be further described.

To the vessel G is attached a pipe, T, which enters the top of the vessel B, extending down to the bottom thereof and terminating in a curved lateral branch, $g$, projecting in the same direction as the branch $f$. Instead of passing down to the bottom of the vessel the pipe T may enter the pipe R and terminate in a contracted nozzle, forming an injector, as indicated at $l$ in Fig. 4.

The vessel G is provided with a perforated diaphragm, V, arranged above the plane on which the pipe T connects therewith, and to the upper end of said vessel is attached a pressure-valve, J, provided with a weighted lever, $h$. To said valve is attached a pipe, W, which communicates with a meter, X, to which is attached a pipe, Y, which communicates with a tank, A', and extends to the bottom thereof, as shown in dotted lines in Fig. 1. The tank is also supplied with a pressure-valve, B', provided with a weighted lever, $i$, a pressure-gage, C', and discharge-pipes D', having valves $j$. The pipe W is provided with a valve, $k$, and a pressure-gage, E'.

The pipes in the several vessels should be provided with back-pressure valves.

The several parts of the apparatus being constructed substantially as described, the operation is as follows: The several vessels B, C, D, E, F, and G are filled with crude petroleum-oil to about the dotted line $o$, (shown in Fig. 2,) by opening the valves $a$ in the branches L and $b$ in the supply-pipe M, and when the oil in the several vessels has reached the point indicated by the line $o$ the valve $b$ is closed, and then the valves $a$ are closed. The oil remaining in pipe K is drawn off through pipe N into a suitable vessel by opening the valve $d$. The tank A having been filled with water, steam is applied by pipe $a'$, the water in the tank heated, and through it the oil in the several vessels, to a temperature not exceeding 100° Fahrenheit. The air-pump is then put into operation and atmospheric air is forced through pipe R, and is discharged at the bottom of the vessel B through the curved branch $f$, imparting to the oil in said vessel a circular or whirling motion, and passing up through the oil in said vessel enters the space above the oil, where it is separated from the liquid and passes through the pipe S into the vessel C, and is discharged in the bottom thereof, imparting to the oil a whirling or circular motion, as in vessel B, and rising to the surface of the oil it is again separated from the liquid and passed on through each of the remaining vessels successively with the same effect. From the vessel G the gas is returned to the bottom of the vessel B through the medium of the pipe T and discharged through the branch $g$, accelerating the whirling motion of the oil in said vessel, and again rising to the surface mingled with the incoming air from the pump the oxygen and nitrogen of the air is further enriched with the carbon and hydrogen of the oil. The gas contained in the vessel B above the line $o$ is now forced by the pressure of the incoming air into the next vessel, and so on throughout the series of vessels, and again returned to the vessel B. This operation is repeated until the pressure in the vessel G above the line $o$ has reached the point fixed upon to open the valve J, by which time the air will have been conducted through the oil so many times that the elements of the air will have united with the carbureted hydrogen given off by the oil, and by the affinity of the particles or atoms of these elements for each other each will have absorbed so much of the other that a union is formed and a fixed gas generated under pressure which will not condense under ordinary circumstances in the holder.

Any liquid carried by the air from the vessels will be precipitated in its passage through the perforated diaphragm V in the vessel G, and thus prevent the possibility of any liquid being carried over into the holder A'.

By the repeated circulations of the air through the several vessels containing oil the effect is as follows: Let it be supposed that the maximum pressure is set at thirty (30) pounds, and the maximum height of five of the vessels is six (6) feet, and the vessel G eight (8) feet, and a depth of four feet of oil in each vessel. In this case the air would pass through twenty-four (24) feet of oil and have undergone six (6) distinct separations from the oil by the time it reaches the upper part of the vessel G and have generated a fixed gas. By the time the gas has reached its maximum pressure of thirty (30) pounds it will have been circulated through each of the vessels containing the oil not less than thirty (30) times, making in the aggregate a column of not less than seven hundred and twenty (720) feet of oil through which the gas has passed and been directly separated therefrom one hundred and eighty (180) times, when it will pass through the pipes W and Y into the holder A' and be ready for use in the form of a rich fixed heating-gas, which may be utilized for general heating purposes.

It will be further observed that by the whirling motion given to the body of oil by the air discharged through the lateral branches $f$ and $g$ in the several vessels the air will follow the circular current motion of the oil, and thereby increase the length of time required for it to rise to the surface, and that by passing through the oil in this manner it is exposed to the hydrocarbon a greater length of time than if it passed directly up through it, whereby the air becomes more thoroughly impregnated with the component parts of the oil, and the generation of gas is greatly accelerated.

It is obvious that the gas from the vessel G may be conducted to any one of the vessels preceding it and then follow on through the remaining vessels of the series.

In practicing my invention it has been discovered that a barrel of crude petroleum-oil which contains about forty (40) gallons, after having been subjected to my process until the specific gravity has been reduced to a point ranging from twenty-five (25°) to thirty, (30°,) and nearly all of the lighter products converted into gas, it will yield about eight (8) gallons of superior lubricating-oil, which is of twice the commercial value of the barrel of crude petroleum from which it was extracted. I have also discovered in practicing my invention that the specific gravity of the oil should be at least 55°, and never above 60°, which can be had by mixing benzole (the specific gravity of which is usually 65°) with heavy oil. For example, if the oil is 45° and the benzole 65°, then equal parts are taken and mixed.

In my application No. 179,428, filed October 9, 1885, I have shown a series of vessels containing oil, through which air is conducted to the bottom by a pipe, rises through the oil and is separated therefrom, and then passes on through the next vessel in the same manner, but have not therein claimed either the process or the means employed for the purpose; and in another application filed herewith, No. 192,892, I have shown the several vessels containing oil combined with other elements to produce an illuminating-gas.

Having thus fully described my invention, what I claim is—

1. The process of generating gas, which consists in conducting air under pressure into a vessel containing oil under pressure and discharging it at or near the bottom of the vessel, conducting it up through the oil, and separating it therefrom in a space above the oil, then conducting it into other vessels containing oil under pressure, and finally discharging the gas into a holder at a pressure greater than the initial pressure of the air, substantially as described.

2. The process of generating gas, which consists in circulating air through a body of hydrocarbon oil contained in a close vessel or vessels, separating the resulting gas from the oil, returning the gas to the vessel or vessels containing the oil, intermingling it with fresh air, and again conducting it through the oil, substantially as described.

3. The process of generating gas, which consists in maintaining hydrocarbon oil at a temperature below the evolving-point of its lighter products, conducting air under pressure into a series of vessels, containing said oil, which is also under pressure, passing the air through the oil and separating it therefrom in each vessel, and finally discharging the gas into a holder at a pressure greater than the initial pressure of the air, substantially as described.

4. The process of generating gas, which consists in maintaining hydrocarbon oil at a temperature below the evolving-point of its lighter products, conducting air under pressure through a body of said oil contained in a close vessel, separating the resulting gas from the oil, returning the gas to the vessel containing the oil, mingling it with fresh air, and again conducting it through the oil, substantially as described.

5. The combination of a series of vessels connected by pipes which extend from the upper part of one to lower part of another vessel, a pipe extending from the last vessel to one of the preceding vessels, and a pressure-valve, as described, substantially as and for the purpose set forth.

6. The combination of a tank or bath, a series of vessels projecting into said tank and connected by pipes which extend from the upper part of one vessel to the lower part of another, a pipe extending from the last vessel to one of the preceding vessels, and a pressure-regulating valve between the last vessel and the holder, substantially as described.

7. The combination of a series of vessels connected by pipes which extend from the upper part of one to the lower part of another vessel, a perforated diaphragm in the last vessel, and a pipe communicating with said vessel below the diaphragm, and with one of the preceding vessels, substantially as described.

8. The combination of a series of connected vessels, a tank into which the vessels project, and suitable supply-pipes for the vessels and the tank, substantially as described.

9. The combination of a series of connected vessels, a pipe arranged below and connecting with each vessel and provided with a supply and a discharge branch, and suitable valves whereby the vessels may be charged and discharged through the same pipe, substantially as described.

10. In an apparatus for generating gas, the combination of an air-pump, a series of connected vessels, a pressure-regulating valve and a storage-tank whereby gas may be generated and stored in a tank under a predetermined pressure, substantially as described.

In testimony whereof I affix my signature in presence of two witnesses.

JAMES J. JOHNSTON.

Witnesses:
S. A. PERRY,
WM. E. DYRE.